Oct. 13, 1964     S. RYDBERG     3,152,553
ROTARY PUMP OR THE LIKE

Filed Nov. 21, 1961     2 Sheets-Sheet 1

INVENTOR.
Sverker Rydberg
BY
Hovey, Schmidt, Johnson & Hovey
ATTORNEYS.

Oct. 13, 1964    S. RYDBERG    3,152,553
ROTARY PUMP OR THE LIKE
Filed Nov. 21, 1961    2 Sheets-Sheet 2

INVENTOR.
Sverker Rydberg
BY
Hovey, Schmidt, Johnson & Hovey
ATTORNEYS.

ns Patent Office 3,152,553
Patented Oct. 13, 1964

3,152,553
ROTARY PUMP OR THE LIKE
Sverker Rydberg, Linkoping, Sweden
Filed Nov. 21, 1961, Ser. No. 153,971
Claims priority, application Sweden Dec. 13, 1960
5 Claims. (Cl. 103—149)

This invention relates to a device for use as rotary machines such as pumps, motors, fluid meters and the like, and pertains particularly to a diaphragm structure for use in such devices.

In rotary machines useful as pumps, motors and fluid meters, it is known to mount a roller having a convex surface of revolution on a crank or eccentric, which roller rolls against a resilient diaphragm clamped over a correspondingly concave surface of revolution arranged in a housing and which, in doing so, presses the diaphragm against a concave groove.

Devices of this type are inconvenient in that the shaft of the roller has to be mounted in such a way that it can be displaced radially in order to render it possible to cause the roller to roll in the concave groove, and in that the diaphragm becomes overworked and ruptures along its center line.

It is also known to employ, in such machines, one or more rollers having a cylindrical surface of revolution and a diaphragm which is provided on its side opposite to the groove with a convex bead which is shaped in such a way that the other side of the diaphragm will sealingly engage the groove by the roller pressing against the bead. Devices of this type, which operate satisfactorily in themselves, have turned out to suffer from the inconvenience that the diaphragm tends to rupture at its thickest portion after a comparatively short operating time. Difficulties have also been encountered when it comes to clamping the diaphragm to the periphery of the housing and between the inlet and outlet openings for the fluid.

Accordingly, it is the object of this invention to provide a rotary pump or the like wherein the diaphragm is formed as a cylindrical pot having, at its open end, an outwardly directed plane flange, and a flat bottom which is provided with a central opening for the rotor shaft. The diaphragm is also provided with an external axial rib adapted to sealingly engage a corresponding axial slot in the housing located between the outlet and inlet openings of the pumping groove. Further, the bottom of the diaphragm is retained against one fixed end wall of the housing by a washer plate or the like, which engages the interior face of the bottom and is secured to the end wall by screws, while the flange of the diaphragm is adapted to be clamped under the cover of the housing.

The invention is illustrated in the annexed drawings, wherein.

Figure 1:
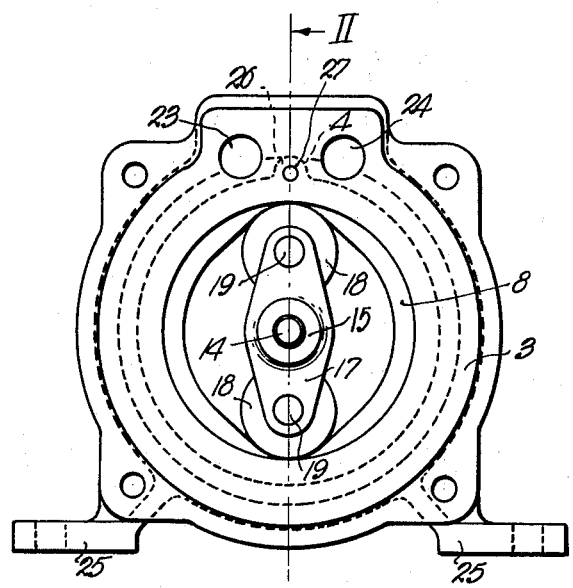
FIGURE 1 is an elevational view of one end of a rotary pump or the like embodying the present invention, the cover plate being removed for purposes of illustration.
Figure 2:
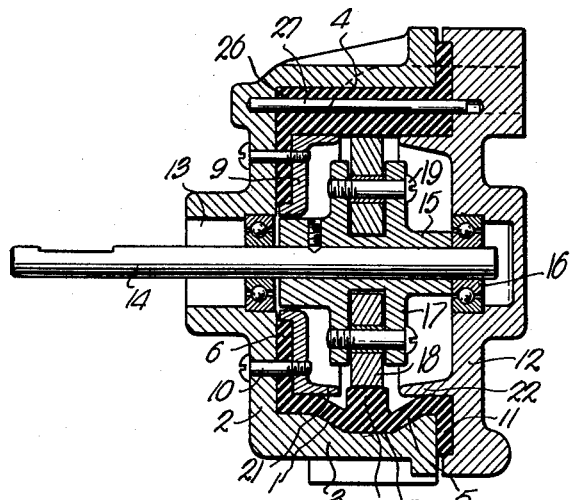
FIG. 2 is a sectional view taken on line II—II of FIG. 1 and showing the diaphragm seated in the groove.
Figure 3:
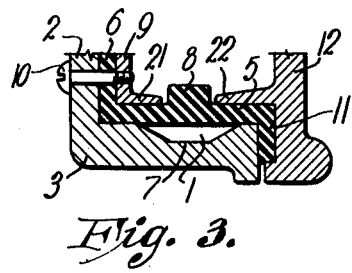
FIG. 3 is a fragmentary view showing the diaphragm spaced from the groove.
Figure 4:
FIGS. 4, 5 and 6 are fragmentary, sectional views showing various transverse, cross-sectional configurations which the bead of the diaphragm may have.

The rotary pump or the like includes a housing formed as a cylindrical pot with a plane bottom 2, provided with a groove 1 in its cylindrical periphery 3, said groove having the cross-sectional shape of a truncated V. This groove 1 extends about the periphery 3, but is interrupted at one point by an axial, deeper slot 4.

There is disposed within the housing a diaphragm of elastomeric material, such as rubber, which diaphragm is formed as a cylinder 5 engaging the housing and having a flat bottom 6. Radially above the flat bottom 7 of the groove 1, the diaphragm has a bead 8 which is slightly higher than the depth of the groove, said depth being substantially smaller than the width of the groove 1.

The bead 8 may have various transverse, cross-sectional configurations, illustrative forms of which are shown in FIGS. 3–6. Further, the bead 8 may be connected to the diaphragm at its base, or may loosely engage said diaphragm.

The cylindrical portion 5 of the diaphragm is provided on its outer surface, with an axial rib 26 which is adapted to sealingly fit the axial slot 4 in the periphery 3 of the housing. It has proved advantageous to provide this rib 26 with an axial bore through which a pin 27 is adapted to pass and enter into corresponding recesses in the bottom 2 and the cover 12 of the housing, so that the rib 26 is retained in the slot 4.

The diaphragm is also retained in the housing by means of a washer plate 9 which is maintained in clamping engagement against the flat bottom 6 of the diaphragm by means of screws 10. At its opposite end, the diaphragm is provided with an outwardly projecting flange 11 adapted to be clamped under the cover 12 of the housing.

The bottom 2 of the housing is provided with a central opening 13, as is also the bottom 6 of the diaphragm, said openings corresponding and receiving a shaft 14 of a rotor 15 disposed within the housing. The shaft 14 is journalled in the opening 13 and also in a bearing 16 mounted in the cover 12 of the housing.

Figure 5:
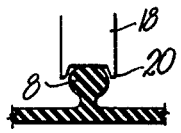
Figure 6:

The rotor 15 is provided with arms 17 which carry rollers 18 having axial bearing pins 19. The rollers 18 are adapted to roll against the bead 8 and to press, through the intermediary of the same, the diaphragm against the bottom of the groove 1. The rollers 18 may, if desired, be provided with guide projections 20 such as shown in FIG. 5, which guide the bead 8 so that it does not tilt laterally. The width of the rollers 18 is substantially equal to that of the bead 8.

The washer plate 9 is suitably provided at its periphery with a cylindrical skirt 21 reaching close to the bead 8 and engaging the inside of the diaphragm; and the cover 12 of the housing is provided on its inside with a corresponding cylindrical skirt 22.

The bead 8 does not extend along the entire inner surface of the cylinder 5 of the diaphragm but, at the point thereon opposite the axial slot 4, it runs into elimination, as does also the groove 1.

Figure 7:
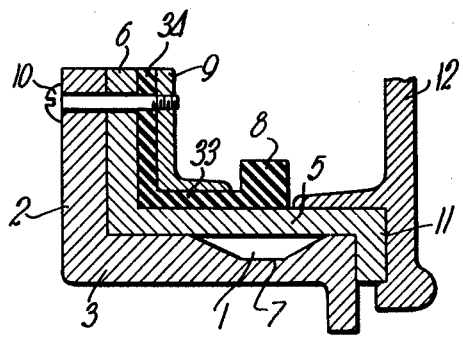
FIG. 7 is a view similar to FIG. 3 showing a modified form of the bead and diaphragm.

In the modified form of the invention shown in FIG. 7, the bead 8 is separate from the diaphragm, in which case it is suitably secured along the edge of a cylindrical member 33 disposed within the diaphragm and engaging the latter, the member 33 being provided with a plane bottom 34 clamped under the washer plate 9, as is also the diaphragm.

Figure 8:
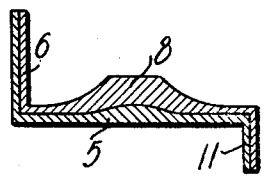
FIG. 8 is a fragmentary, sectional view illustrating a diaphragm which is composed of materials of varying hardness.

FIGURE 8 illustrates a further form of the invention wherein the bead 8 and the inner portions of the diaphragm are of a harder and less resilient material than the outer portion of the diaphragm.

It has also proved suitable to provide the diaphragm, adjacent its axial rib 26, with external thickenings sloping in both directions from the rib 26 and disposed right above the bead 8, said thickenings being intended to prevent the diaphragm from creasing when roller 18 is passing the rib 26.

The housing 2 is provided, in the known manner, with inlet and outlet openings 23 and 24 respectively, connecting to either end of the groove 1, and the housing is suitably also provided with feet 25 for attaching the housing to a base plate.

Although only a few embodiments have been illustrated and described herein, it is intended that other embodiments may be included within the scope of this invention.

Having thus described the invention, what is claimed as new and desired to be secured by Letters Patent is:

1. A rotary pump comprising a cylindrical housing having a circumferentially extending groove formed on the inner face thereof and an axially extending slot formed therein between an inlet and outlet opening in communication with said groove; a diaphragm disposed across the groove; a bead on the inner face of the diaphragm; a perforate wall at one end of the housing; a cover plate at the opposite end thereof; a roller adapted to roll against said bead and in doing so to press the diaphragm into the groove, said diaphragm being in the form of a cylindrical pot having an outwardly directed flange at one end thereof and a flat bottom at the opposite end thereof, the bottom being provided with a central opening adapted to receive a rotor shaft; an axial rib on the outer surface of said diaphragm and adapted to sealingly fit within said slot; a washer plate in engagement with the inner surface of said bottom; and fastening means securing said plate to said end wall whereby to retain said bottom against said end wall, said outwardly directed flange being clamped between said cover plate and said housing, said axial rib having a bore extending therethrough and adapted to receive a pin for engagement with the end wall and the cover plate whereby to retain said rib in said slot.

2. The invention as set forth in claim 1, wherein the bead and the diaphragm are separate components, there being a cylindrical member disposed within the diaphragm and in engagement therewith, said cylindrical member having a bottom clamped under said washer plate, the bead being secured to the edge of said cylindrical member.

3. The invention as set forth in claim 1, wherein said bead is formed of a harder material than that from which the major portion of the diaphragm is formed.

4. The invention as set forth in claim 1, wherein said roller is provided with guide flanges.

5. A rotary pump comprising a cylindrical housing having a circumferentially extending groove formed on the inner face thereof and an axially extending slot formed therein between an inlet and an outlet opening in communication with said groove; a diaphragm disposed across the groove; a bead on the inner face of the diaphragm; end walls for said housing; a roller adapted to roll against said bead and in doing so to press the diaphragm into the groove, said diaphragm being in the form of a cylindrical pot; means for retaining portions of said diaphragm with respect to said housing; and an axial rib on the outer surface of said diaphragm and adapted to fit within said slot, said axial rib having a bore extending therethrough and adapted to receive a pin for engagement with the end walls of said housing whereby to retain said rib in said slot.

References Cited in the file of this patent

UNITED STATES PATENTS

| 2,434,802 | Jacobs | Jan. 20, 1948 |
| 2,671,412 | Rand | Mar. 9, 1954 |

FOREIGN PATENTS

| 768,253 | Great Britain | Feb. 13, 1957 |
| 785,597 | Great Britain | Oct. 30, 1957 |